(12) United States Patent
Bauer

(10) Patent No.: US 7,587,967 B2
(45) Date of Patent: Sep. 15, 2009

(54) WOODWORKING MACHINE

(75) Inventor: Reinhold Bauer, Neuburg (DE)

(73) Assignee: Scheppach Fabrikation von Holzbearbeitungsmaschinen GmbH, Ichenhausen (DE)

( * ) Notice: Subject to any disclaimer, the term of this patent is extended or adjusted under 35 U.S.C. 154(b) by 201 days.

(21) Appl. No.: 11/712,980

(22) Filed: Mar. 2, 2007

(65) Prior Publication Data

US 2007/0215243 A1 Sep. 20, 2007

(30) Foreign Application Priority Data

Mar. 3, 2006 (DE) .................... 10 2006 010 433

(51) Int. Cl.
*B26D 1/18* (2006.01)
(52) U.S. Cl. .................. 83/473; 83/522.18; 83/477.2; 83/477.1
(58) Field of Classification Search ............ 83/471.3, 83/477, 477.1, 472, 473, 432, 522.18, 522.15, 83/477.2, 581; 144/218
See application file for complete search history.

(56) References Cited

U.S. PATENT DOCUMENTS

| | | | | |
|---|---|---|---|---|
| 183,397 | A * | 10/1876 | Howard | 83/433 |
| 228,218 | A * | 6/1880 | Pryibil | 83/477.1 |
| 1,387,869 | A * | 8/1921 | Royle | 83/165 |
| 2,015,250 | A * | 9/1935 | Billker | 83/106 |
| 2,435,765 | A * | 2/1948 | Anderson | 83/474 |
| 2,695,638 | A * | 11/1954 | Gaskell | 83/477 |
| 3,011,533 | A * | 12/1961 | Newman, Sr. | 144/1.1 |
| 4,276,799 | A * | 7/1981 | Muehling | 83/473 |
| 5,185,911 | A * | 2/1993 | Upson | 29/401.1 |
| 5,282,408 | A * | 2/1994 | Shiotani et al. | 83/432 |
| 5,875,698 | A * | 3/1999 | Ceroll et al. | 83/473 |
| 6,546,835 | B2 * | 4/2003 | Wang | 83/477.1 |
| 6,684,750 | B2 * | 2/2004 | Yu | 83/473 |
| 6,820,524 | B1 * | 11/2004 | Ceroll et al. | 83/13 |
| 6,820,527 | B2 * | 11/2004 | Chang | 83/471.2 |
| 6,968,767 | B2 * | 11/2005 | Yu | 83/473 |
| 7,320,270 | B2 * | 1/2008 | Liu et al. | 83/471.3 |
| 7,350,444 | B2 * | 4/2008 | Gass et al. | 83/58 |
| 2003/0101857 | A1 * | 6/2003 | Chuang | 83/477.1 |
| 2004/0065181 | A1 * | 4/2004 | Chang | 83/477.2 |
| 2004/0118261 | A1 * | 6/2004 | Garcia et al. | 83/471.3 |
| 2004/0237742 | A1 * | 12/2004 | Liao et al. | 83/473 |
| 2005/0188806 | A1 * | 9/2005 | Garcia et al. | 83/471.3 |
| 2007/0044615 | A1 * | 3/2007 | Chen | 83/477.1 |
| 2007/0261527 | A1 * | 11/2007 | Wang | 83/477.1 |

FOREIGN PATENT DOCUMENTS

EP 0 235 683 A2 9/2007

* cited by examiner

*Primary Examiner*—Kenneth E. Peterson
*Assistant Examiner*—Sean Michalski
(74) *Attorney, Agent, or Firm*—Bacon & Thomas, PLLC

(57) ABSTRACT

A circular saw having a machine frame having a table board and a swivel frame arranged underneath the table board, which is swiveled about a swivel axis coplanar with the top side of the table board. The swivel frame accommodates a height adjustable tool bracket carrying at least one cutting tool engaging an associated slot in the table board. The swivel frame in the region of its ends is swivel-suspended on bearing brackets which are mountable on the bottom side of the table board, and are swiveled by an articulated adjusting rod. The tool bracket is height adjusted by an adjusting element which is arranged in driving linkage with an extendable articulated shaft. The adjusting rod and the articulated shaft are operated by cranks mounted on the operating side of the machine frame.

20 Claims, 6 Drawing Sheets

WOODWORKING MACHINE

FIELD OF THE INVENTION

The present invention relates to a woodworking machine, in particular a circular saw, provided with a machine frame on which a table board is accommodated, and further provided with a swivel frame arranged underneath the table board, which can be swivelled about a swivel axis coplanar with the top side of the table board, which swivel frame accommodates a height adjustable tool bracket carrying at least one cutting tool engaging an associated slot in the table board, which tool can be clamped onto a shaft drivable by a motor attached to the tool bracket.

BACKGROUND OF THE INVENTION

An arrangement of this kind is known, for example, from EP 0 235 683 B1. In this known arrangement, the swivel frame, in the region of its front and rear end, is provided with sliding stones which in pairs engage an associated curved slot of a front and rear stationary end shield which is integrated into the machine frame. Such end shields, at their bottom rim which is concentric to the curved slot, are provided with gear teeth which are in engagement with a pinion that can be driven by a handwheel. The pinion shaft associated with the pinions and accommodating the handwheel is mounted on the swivel frame and projects from the machine frame requiring, for that purpose, a reach-through slot which is arranged in concentric position to the curved slot of the stationary end shields.

The disadvantage, however, of such an arrangement lies in the fact that the pinion shaft carries out all swivel movements of the swivel frame, so that the handwheel accommodated on the pinion shaft changes its position during each swivel movement of the swivel frame. This constitutes an undesirable effect with regard to operation. Furthermore, the reach-through slot of the machine frame, through which the pinion shaft extends may constitute a safety risk and has to be guarded accordingly. The direct transmission of the rotary movement of the handwheel to the swivel frame has an unfavourable effect also with regard to the obtainable degree of accuracy. Furthermore, in the known arrangement the swivel frame suspended in the machine frame is separated from the table board, rendering assembly difficult.

On the basis of the foregoing, it is thus the object of the present invention to improve a device as described initially above by using simple and low-cost means, so that not only a high degree of user-friendliness, safety and accuracy, but also a clear-cut design are achieved.

SUMMARY OF THE INVENTION

According to the invention, this object is achieved in that the swivel frame in the region of its ends, which in cutting direction lie opposite each other, is swivel-suspended on bearing brackets which are mountable on the bottom side of the table board, and can be swivelled by means of an articulated adjusting rod arranged with a degree of freedom for swivel movements, and further in that the tool bracket accommodated on the swivel frame can be height adjusted by means of an adjusting element provided on the swivel frame, such adjusting element being arranged in driving linkage with an extendable articulated shaft, and further in that the adjusting rod and the articulated shaft can be operated by at least one actuating means firmly mounted on the operating side of the machine frame.

In this example, the table board as well as the swivel frame together with the tool bracket constitute a group of components all of which, in an advantageous manner, can be pre-assembled. This fact ensures an exact position of the swivel axis of the swivel frame, which is coplanar with the table surface, and thus a high degree of obtainable working accuracy. The adjusting rod associated with the swivel frame and actuatable by means of an actuating means further ensures a high reduction ratio which has an advantageous effect on the achievable degree of operating accuracy. The same applies to the articulated shaft associated with the tool bracket, ahead of and/or following which provision may be made for reduction devices. A further advantage of the measures according to the invention lies in the fact that each actuating means, due to its flexibility within the drive train, is in a stationary position relative to the swivel frame and/or the tool bracket, so that neither in this case a reach-through slot in the housing associated with a shaft connected with an actuating means is required. As a result, a high degree of user-friendliness and safety as well as high stability of the machine housing is obtained. The measures according to the invention thus in an advantageous manner completely avoid the disadvantages of the prior art arrangement.

Advantageous embodiments and expedient developments of the main-claim measures will be evident from the sub-claims.

Thus, the adjusting rod associated with the swivel frame may advantageously be designed as a threaded spindle which on one side engages a bolt which is swivel-mounted in the swivel frame and in axial direction accommodated stationary in the same, and is on the other side swivel-mounted about the axle of the associated actuating means and acts together with the associated actuating means via angle drive. By using a threaded spindle, a comparatively high reduction ratio is achieved which, if required, may even be increased by a suitable design of the angle drive. Furthermore, the threaded spindle in an advantageous manner causes a self-locking effect which enhances operating convenience and accuracy.

In a further development, the adjustin element associated with the tool bracket may advantageously be designed as a threaded spindle which is provided on the swivel frame in a vertical position, which threaded spindle engages a bolt firmly attached to the tool bracket and, via an angle drive, is connected with an articulated shaft provided with joints at both ends thereof. This arrangement likewise ensures in an advantageous manner a high reduction ratio as well as a self-locking effect.

A further, particularly preferable measure may consist in that the adjusting rod and the adjusting spindle are associated with an actuating means each which may be provided in an advantageous manner at a certain lateral distance and at the same level. Said measures enable the swivel device and the height adjustment to be actuated synchronously.

Expediently, the swivel frame may be designed as a casting comprising a vertical wall which is provided with at least one window opening toward the top through which passes a shaft carrying a cutting tool and, on the side away from the tool comprises a projection accommodating the vertical threaded spindle associated with the tool bracket, as well as guiding means for the tool bracket in a direction parallel to the spindle. This arrangement permits a low-cost and torsion-resistant design of the swivel frame. It is therefore sufficient to provide one adjusting rod.

Advantageously, the swivel frame, at least on its tool side, may be provided with a circumferential marginal flange to which a cover plate is attached and which is preferably interrupted in the tool area. Thus, a chamber associated with the tool and opening towards the top is advantageously formed which can be connected to an exhaust device, which facilitates chip removal.

Expediently, the tool bracket may likewise be designed as a casting comprising a vertical wall which, on the one hand, is provided with projections having guide sleeves, as well as a bearing region associated with the tool carrying shaft, and, on the other hand, with a projection comprising the nut acting together with the threaded spindle thus forming the adjusting element. This arrangement results in a tool bracket which combines the advantages of low-cost and torsion-resistant construction. Simultaneously, the use of castings for the swivel frame and the tool bracket permit a high degree of freedom from vibration, which likewise has a positive effect on the obtainable degree of accuracy.

Further advantageous embodiments and expedient developments of the invention will be evident from description of an example given below in conjunction with the accompanying drawings(s), wherein.

BRIEF DESCRIPTION OF THE PREFERRED EMBODIMENTS

DESCRIPTION OF THE PREFERRED EMBODIMENTS

Figure 1:
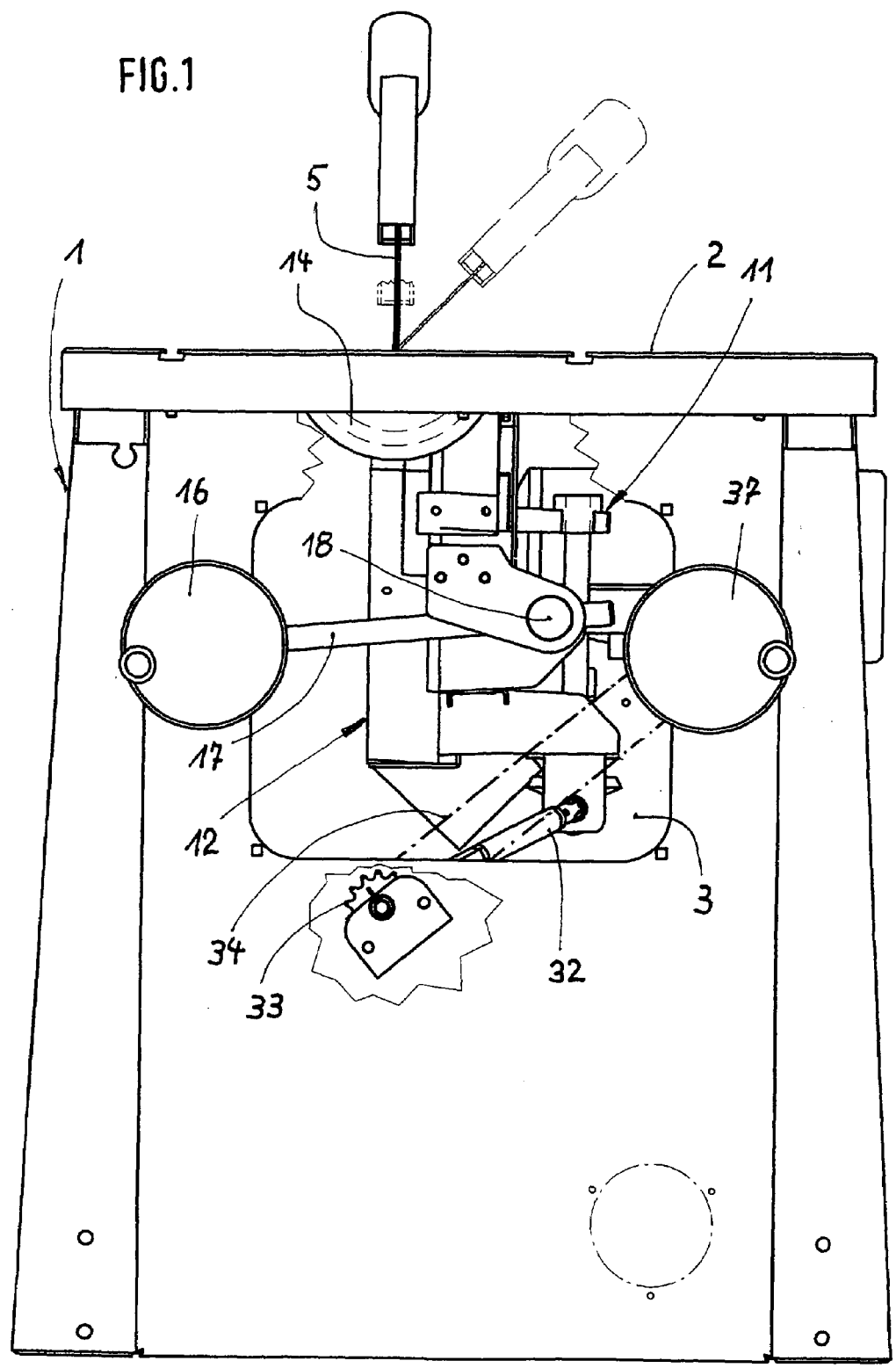
FIG. 1 shows a view of the operator side of a circular saw according to the invention with removed inspection cover and a partly broken out front wall.
Figure 6:
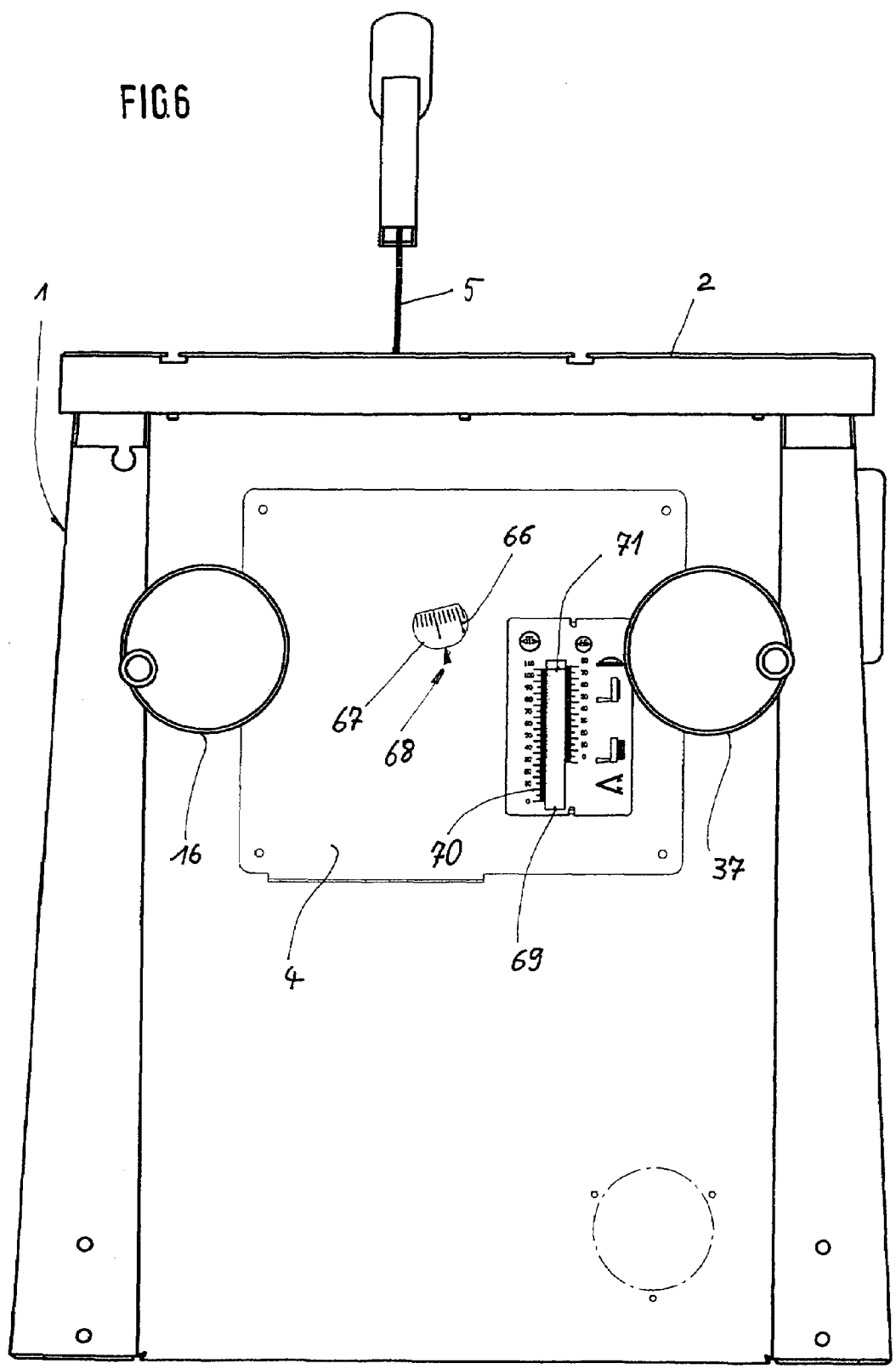
FIG. 6 shows a view of the circular saw according to the invention corresponding to FIG. 1 with fitted inspection cover comprising display units.

The present invention is mainly used for circular saws which are provided with a cutting tool having the form of a circular saw blade. The circular saw underlying the drawing possesses a housing-shaped machine frame 1 on which a table board 2 is accommodated. The housing-shaped machine frame 1, as is evident from FIG. 1, is on the operator side provided with an inspection window 3 which can be closed by an inspection cover shown in removed position in FIG. 1. In FIG. 6 the inspection cover 4 is fitted. The table board 2 possesses a slot not shown in detail in the drawings through which the tool, in this example designed as a saw blade 5, extends. Associated with the saw blade 5 is a board splitter 6 which can best be seen in FIG. 2, to which an exhaust hood 7 may be attached.

The saw blade 5 can be adjusted in height, which fact permits the machining of workpieces of a different thickness. In order to make angular cuts which are inclined relative to the surface of the table board 2, it is possible to tilt the saw blade 5. The swivel axis is practically formed by the intersection line of the surface of the table board 2 with the centre plane of the saw blade 5. Based on a vertical midway position shown by solid lines in FIG. 1, provision can be made for a swivel movement to each side (right or left) or to both sides. In FIG. 1, two possible adjusting positions are indicated by dotted lines.

Figure 2:
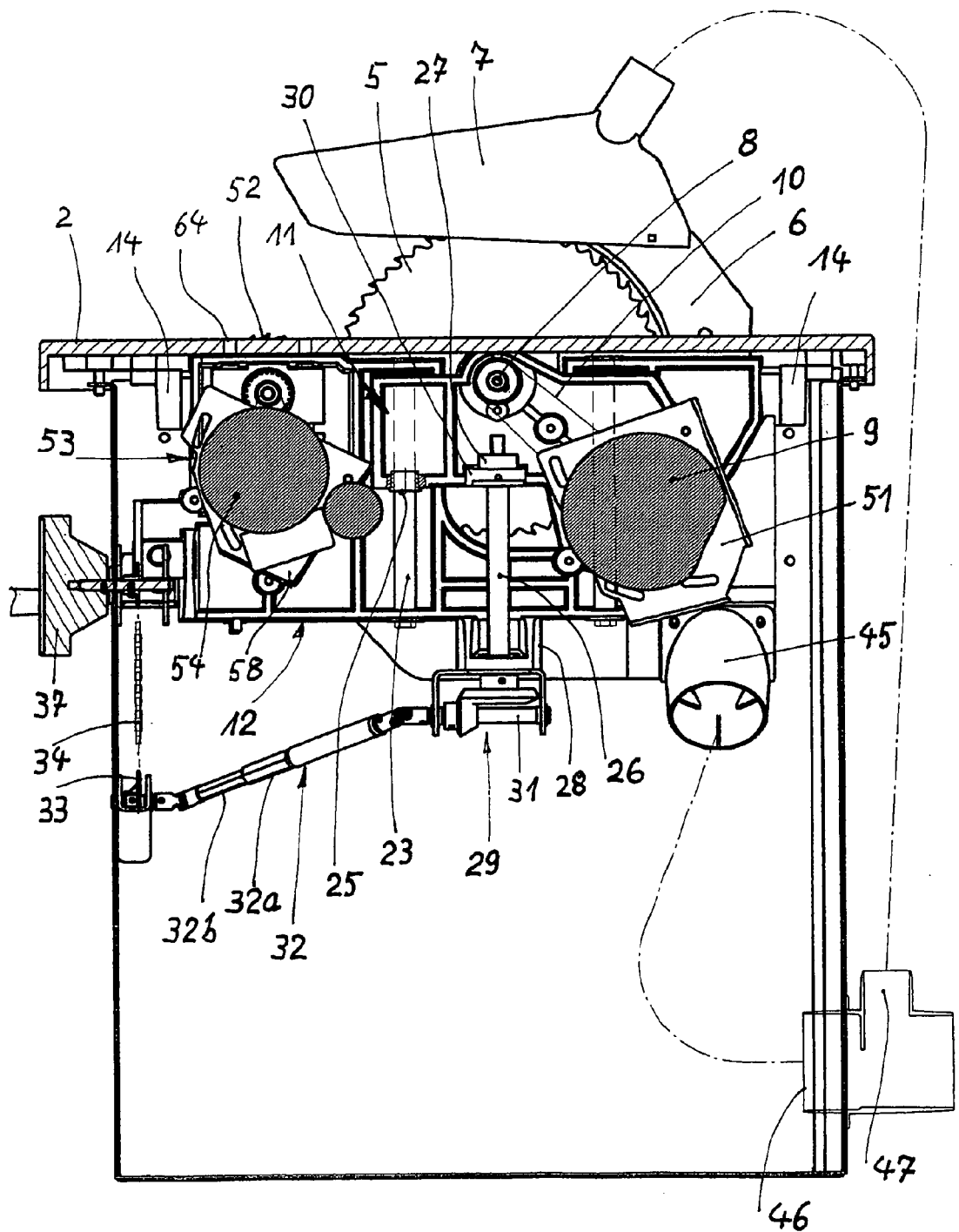
FIG. 2 shows a longitudinal section of the arrangement according to FIG. 1.
Figure 3:
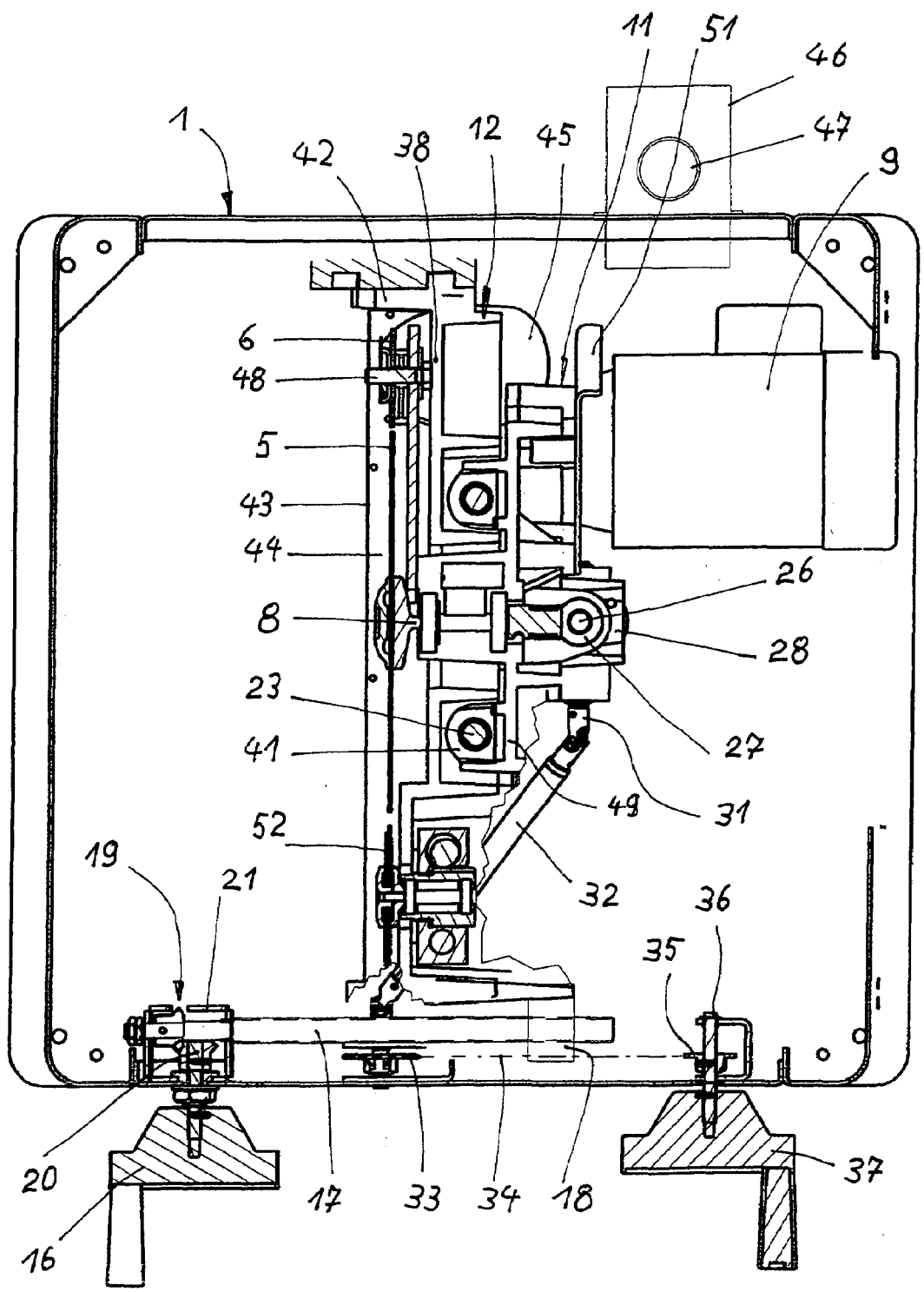
FIG. 3 shows a schematic top view of the arrangement according to FIG. 1 with the table board removed.

The saw blade 5, as can be seen in the FIGS. 2 and 3, can be clamped on a tool shaft 8 located underneath the table board 2 which is drivable by an associated electric motor 9. Expediently, the motor shaft is offset relative to the tool shaft 8 and arranged in drive linkage with a stepping down unit 10 as can best be seen in FIG. 2, which stepping down unit may be designed as a belt drive. The tool shaft 8, as is further shown in the FIGS. 2 and 3, is mounted on a tool bracket 11 to which the motor 9 is likewise attached. The tool bracket 11 on its part is height adjustable and accommodated on a swivel frame 12 arranged underneath the table board 2, which is swivellable about the swivel axis as described above which is coplanar with the upper side of the table board.

Figure 4:
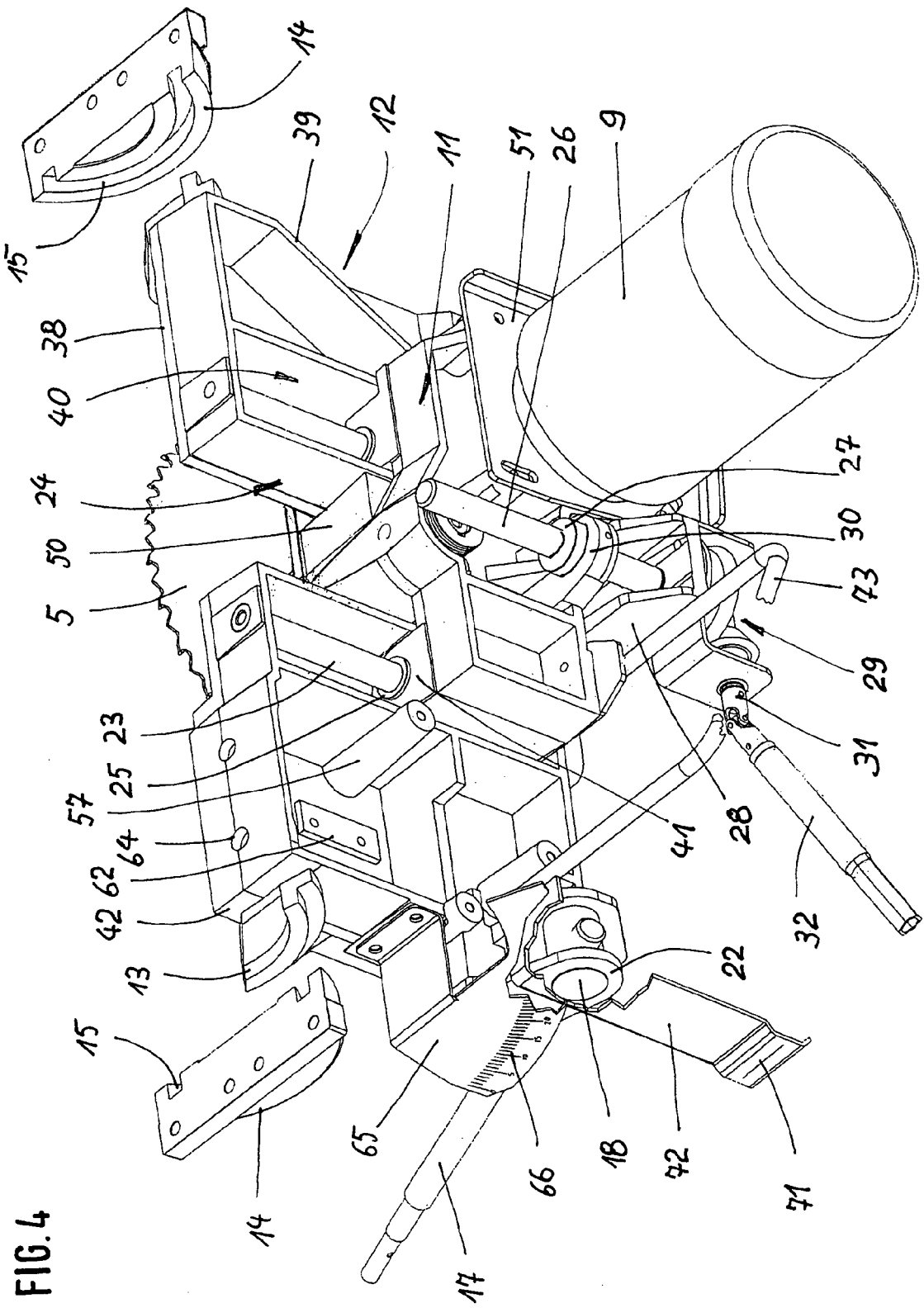
FIG. 4 shows a perspective view of the swivel frame with integrated tool bracket and the associated bearing brackets.

Said swivel frame 12, as can best be seen in FIG. 4, is provided with ring segment-shaped bearing strips 13 arranged at its ends lying opposite each other in cutting direction and extending concentrically to the above-described swivel axis, such swivel frame 12 being swivel-mounted together with the said bearing strips 13 on the bearing brackets 14 which are attachable by means of screws to the bottom side of the table board 2. The bearing brackets 14 are provided with segment grooves 15 associated with the bearing strips 13 which engage the segment grooves 15 in a groove and tongue engagement. The table board 2, the bearing brackets 14 mountable thereon as well as the swivel frame 12 which can be accommodated on the latter and the tool bracket 11 which is receivable on said swivel frame 12 form a group of components which can be pre-assembled as a unit. The tool bracket 11 and the swivel frame 12 are expediently designed as castings, as is clearly illustrated in FIG. 4.

In order to swivel the swivel frame 12, an adjusting rod 17 is associated therewith, as can be seen in the FIGS. 1 and 3, which can be actuated by means of a handwheel 16 provided in the region of the operator side of the machine frame 1, which adjusting rod 17 is articulated to the swivel frame 12 and possesses the required degree of freedom for tilting movements. The adjusting rod 17 may be designed, for example, as a threaded rod or the like. In the illustrated example, the adjusting rod 17, in an advantageous manner, is designed as a threaded spindle which, on the one hand, engages a nut 18 which is swivel-mounted in the swivel-frame 12, and in an axial direction accommodated stationary in the same, and, on the other hand, can be swivelled about the axis of rotation of the associated handwheel 16 and acts together with the handwheel 16 via an angle drive 19, as is evident from FIG. 3. The angle drive 19 is formed by two bevel gears, one of which is accommodated on a shaft butt 20 held in a bearing on the frame and connected with the handwheel 16, while the other is received by the neighbouring end of the adjusting rod 17 engaging a bearing housing 21 which can be swivelled about the axis of the shaft butt 20. The design of the adjusting rod 17 as a threaded spindle provides a self-locking effect combined with a large reduction ratio. The nut 18 associated with the threaded spindle, as can best be seen in FIG. 4, is designed as a pin which can be moved about its axis and is held by a fork shaped bearing 22 attached to the swivel frame 12, which pin is provided with a tapped hole which extends transverse to its axis and is engaged by the threaded spindle forming the adjusting rod 17.

The height adjustable tool bracket 11 accommodated on the swivel frame 12, as is evident from the FIGS. 2 to 4, is guided on vertical guiding rods 23 of the swivel frame 12. In the illustrated example, provision is made for two guiding rods 23 flanking a window 24 for the tool shaft 8 and/or the bearing device associated therewith. The tool bracket 11 is provided with guide bushes 25 associated with the guiding rods 23. In order to permit adjustment of the tool bracket 11 in a vertical direction on the swivel frame 12, provision is made for a threaded spindle 26, as can further be seen in the FIGS. 2 to 4, which is parallel to the guiding rods 23, accommodated on the swivel frame in a vertical position and which serves as an adjusting device associated therewith, which spindle is in engagement with a nut 27 mounted on the tool bracket 11.

The threaded spindle 26 is accommodated on a projection 28 of the swivel frame 12 extending underneath the tool bracket 11 and drivable by an angle drive 29 which is provided on the bottom side of the projection 28. The nut 27 is arranged on a projection 30 of the tool bracket 11 and extends over the projection 28.

The angle drive 29 is formed by two bevel gears, one of which is mounted on a receiving butt of the threaded spindle 26 and extends through the projection 28, while the other is accommodated on an associated gear shaft 31 mounted on a gear housing which is formed by a bow attached to the projection 28. Joined to the gear shaft 31 is an articulated shaft 32 which, with its other end, is joined to a drive wheel 33, as can best be seen from FIG. 2, which is swivel-mounted on the inner side of the operator side wall of the machine frame 1. Said drive wheel 33, as is evident from the FIGS. 2 and 3, is connected in terms of drive with an associated counter wheel 35 via a circulating element 34, such counter wheel 35 being received by a shaft butt 36 which is swivel-mounted on the operator side of the machine frame 1, the outer end of such shaft butt 36 carrying an associated handwheel 37. Expediently, the circulating element 34 is designed as a chain. The drive wheel 33 and the counter wheel 35 are thus designed as sprockets. The handwheel 37 could of course likewise be mounted on a shaft receiving the drive wheel 33. The illustrated embodiment, however, facilitates the provision of the handwheels 16 and 37 at the same height level.

By turning the handwheel 37, the threaded spindle 26 is driven via the drive train in the form of the chain drive comprising the circulating element 34, the articulated shaft 32 fitted with joints on both sides, and the angle drive 29. The rotational movement of the threaded spindle 26 is converted into an adjustment movement of the tool bracket 11 by means of the nut 27. As a result, this arrangement provides for a high reduction ratio as well as a self-locking effect.

The length of the articulated shaft 32, which is fitted with joints at both ends, is adjustable, so that such articulated shaft 32 permits a swivel movement of the swivel frame 12. For this purpose, the articulated shaft 32 is designed as a two-part shaft comprising two shaft sections 32a, b having multi edge areas which engage each other in a telescope-like manner. Said multi edge areas may be formed integral with each of the associated shaft sections.

In the illustrated example, provision is made for two handwheels 16 and 37, with the handwheel 16 serving for carrying out a swivel movement of the swivel frame 12 and the handwheel 37 serving for carrying out a height adjustment of the tool bracket 11 received on the swivel frame 12. The handwheels 16 and 37 are arranged at a certain lateral distance from each other and at approximately the same height level in the region of the operator side of the machine frame 1, as is evident from FIG. 1. It would, however, be equally conceivable to provide solely one common handwheel to carry out the swivel movement and the height adjustment. Such handwheel could be arranged in an axially adjustable manner and could be alternatively coupled in its end positions with an element acting together with the adjusting rod 17 and/or the articulated shaft 32.

As previously mentioned, the swivel frame 12 is expediently designed as a casting. The latter, as can be seen in the FIGS. 3 and 4, possesses a vertical wall 38 comprising a reach-through window 24 associated with the tool shaft 8 which wall, on the side away from the cutting tool, is provided with ribs 39 comprising a rim flange extending along the rim of said wall. The ribs are designed in such a manner that two chambers 40 are formed which flank the reach-through window 24 and extend over the entire height of the swivel frame 12, and in each of such chambers provision is made for an adjusting rod 23. The adjusting rods 23 with their upper and lower ends are attached to the rim flange areas closing each of the associated chambers. The tool bracket 11 is provided with protrusions 41 projecting into the chambers 40, such protrusions 41 comprising an adjusting rod 23 each held by a guide bush 25. In the region underneath the reach-through window 24 provision is made for the projection 28 of the swivel frame 12 associated with the threaded spindle 26 which may be integrated into the rib arrangement 39. The fork shaped bearing 22 for receiving the nut 18 associated with the adjusting rod 17 is attached to the swivel frame 12 and expediently formed integral therewith in the region of the end of the swivel frame 12 facing the operator side.

On the side facing the cutting tool 5, the wall 38 of the swivel frame 12 does not possess any ribs. In this area, provision is solely made for a rim flange 42 extending at least laterally of and underneath the wall, but omitted on top of it or interrupted at least in the region of the cutting tool, to which rim flange 42 a cover plate 43 extending parallel to the wall is attached, as shown in FIG. 3. In this manner, a chamber 44, which is open at the top, is formed for receiving the tool 5. A connector 45 as shown in the FIGS. 2 and 3 for attaching a suction line branches off from the chamber 44. The connector 45, via a pipe not shown in detail here, may be connected with a sleeve 46 provided in the area of a wall of the machine frame 1, which sleeve 46 may possess a further connector 47 for a suction line extending from the exhaust hood 7 and may in a manner known to the art be connected with an exhaust blower. A pin 48 projecting from the wall 38 and accommodating a board splitter 6 extends through the chamber 44, as is evident from FIG. 3.

The tool bracket 11 is likewise formed as a casting comprising, as is shown in the FIGS. 3 and 4, a vertical wall 49 parallel to the wall 38 of the swivel frame 12, to which wall 49, on the one hand, a bearing device 50 is attached which is associated with the tool shaft 8 and the protrusions 41 comprising the bearing bushes 25, and to which, on the other hand, the projection 30 carrying the nut 27 is attached. On the side away from the swivel frame 12 the wall 49 is in an expedient manner provided with ribs. As can be seen in the FIGS. 2 to 4, an adjustable retaining plate 51 parallel to the wall and carrying the motor 9 is attached to the ribs. Due to the adjustability of the retaining plate 51, a reliable tension of the belt of the belt drive 10 is ensured. In the illustrated example, the retaining plate 51 is held by screws passing through associated oblong holes.

Figure 5:
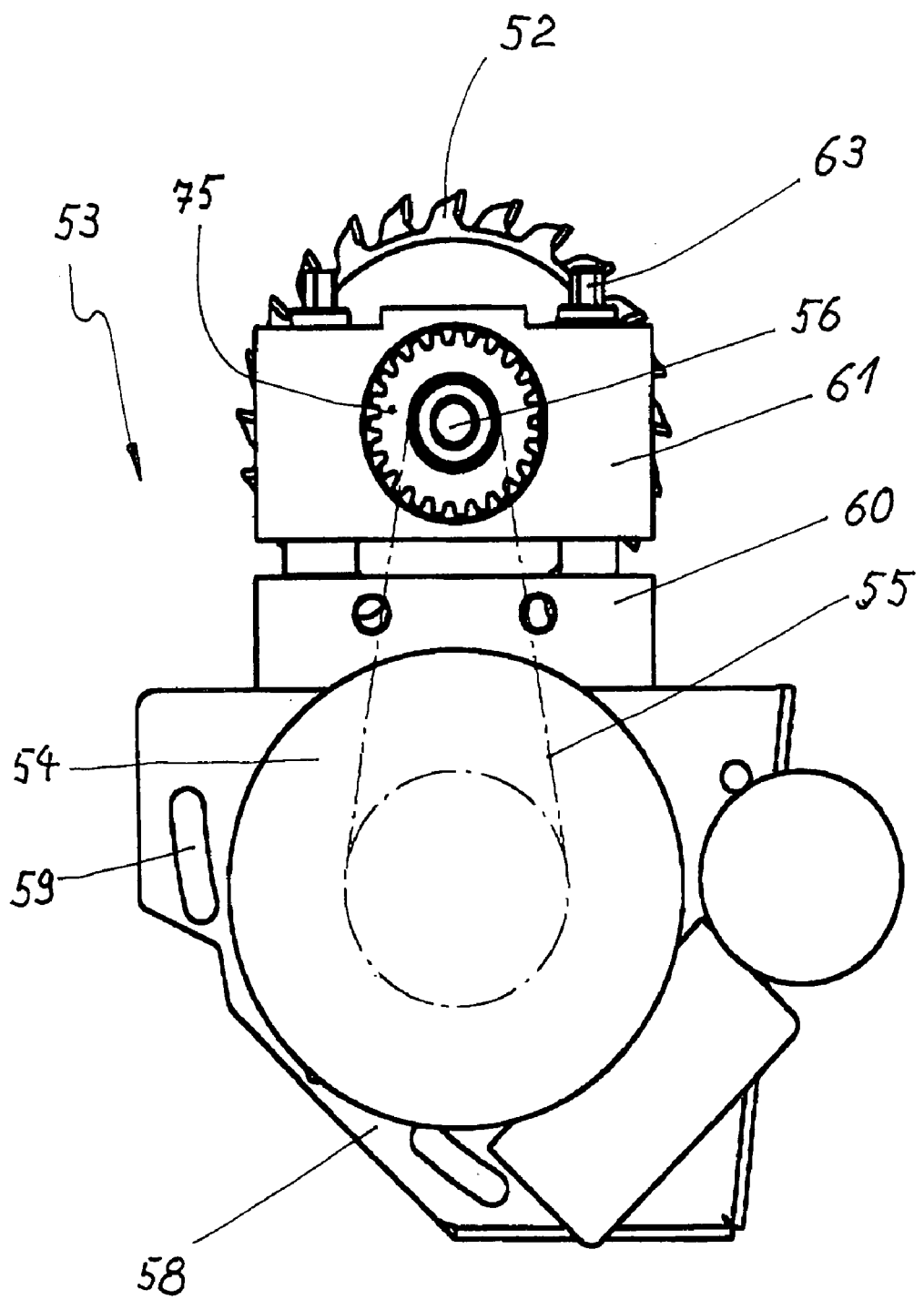
FIG. 5 shows a view of a scoring unit which can be attached to the swivel frame.

When cutting coated boards etc, a scoring tool is usually required which rotates in a direction opposite to the direction of rotation of the actual sawing tool 5. In FIG. 5 a scoring unit 53 is shown which comprises a scoring tool 52 which can optionally be attached to the swivel frame 12. In the FIGS. 2 and 3, the scoring unit 53 is mounted on the swivel frame 12. In FIG. 4 the scoring unit is removed. The scoring tool 52 is arranged in the same plane as the tool 5 and scores the coating of a board which can subsequently be cut through with the aid of the sawing tool 5 without causing the risk of the coating breaking. The scoring unit 53 comprises an electric motor 54 which, via a stepping down unit 55 expediently designed as a belt drive, is connected in terms of drive with a shaft 56 receiving the scoring tool 52. The scoring unit 53, as mentioned on an earlier occasion, is designed as an add-on unit. For this purpose, the scoring unit 53 comprises an add-on device which is attachable to a suitable associated fixture of the swivel frame 12.

In the example illustrated, the vertical wall 38 of the swivel frame 12, as can be seen in FIG. 4, is provided with mandrels 57 projecting from the side away from the tool and forming the fixture for accommodating the scoring unit 53. The latter comprises an add-on shield 58 which is adjustably attachable by means of screws to the mandrels 57, as is indicated by the curved slots 59.

Attached to the add-on shield 58, as can best be seen in FIG. 5, is, on the one hand, the motor 54 and, on the other hand, a support block 60 on which an adjusting block 61 is accommodated comprising the scoring tool 52 which is both height and axially adjustable. The shaft 56 carrying the scoring tool 52 is mounted in the adjusting block 61 and, with sufficient play to allow for axial and vertical adjustment, can be passed through an associated recess in the wall 38. Said recess is covered by a cover plate 62, as is shown in FIG. 4. As can further be seen in FIG. 5, the adjusting block 61 is provided with two adjusting screws 63, one of which serving for height adjustment and the other for axial adjustment. The height is adjusted via the thread of the associated screw 63. The motor 54 is arranged in such a manner that the belt of the stepping down unit 55 is in tensioned condition in any position of the adjusting block 61. In order to effect axial adjustment, the associated screw 63 is provided with a worm not shown in FIG. 5. Such worm acts together with an axially movable worm gear 75 fitted along its circumference into an associated recess of the adjusting block, which worm gear has a lateral provided with a thread engaging a counter thread of the adjusting block. Held in the worm gear 75 together with the collar is the shaft 56. The adjusting screws 63 are accessible from above via holes 64 (shown in FIGS. 2 and 4) in the table board 2 and in the upper side of the swivel frame 12, and can be actuated by an appropriate tool.

To facilitate an exact setting of the desired height of the tool 5 and/or the desired swivel angle of the tool 5 provision is made for associated display devices from which the selected height and/or swivel angle can be read off. Each of the display devices comprises a scale and an associated pointer which are arranged in such a way that readings can be taken on the operator side of the machine, as can be seen in FIG. 6.

The angle display unit comprises an angle scale 66 provided on a board 65 shown in FIG. 4 which is attached to the end of the swivel frame 12 facing the operator side of the machine frame 1 and extends parallel to the operator-side wall of the machine frame 1. The operator-side wall of the machine frame 1, in this example the inspection cover 4 forming an element of the wall, is provided with a window 67 exposing the angle scale 66, as is evident from FIG. 6. Attached to the rim of the window 66 is a pointer 68 indicating the selected angle position. An enlargement lens may be associated with the window 67 to improve readability.

The height display device comprises at least one height scale 70 which is provided in the rim area of a window 69 of the inspection cover 4 and with which a movable pointer 71 is associated appearing in the area of the window 69. Such pointer, as is shown in FIG. 4, is attached to a plate 72 which is parallel to the operator-side wall of the machine frame 1 and which is attached to the height adjustable tool bracket 11 by means of a bow 73. In the area of the window 69 provision is expediently made for several different height scales 70 which are associated with different tool diameters. In the example illustrated, provision is made for two different height scales 70, as is evident from FIG. 6.

What is claimed is:

1. A woodworking machine, in particular a circular saw, having a machine frame on which a table board is accommodated, and further having a swivel frame arranged underneath the table board, which is swivelled about a swivel axis coplanar with the top side of the table board, which swivel frame accommodates a height adjustable tool bracket carrying at least one cutting tool engaging an associated slot in the table board, which tool can be clamped onto a shaft drivable by a motor attached to the tool bracket, wherein the swivel frame in the region of its ends, which in cutting direction lie opposite each other, is swivel-suspended on bearing brackets which are mounted on the bottom side of the table board, and is swivelled by means of an articulated adjusting rod arranged with a degree of freedom for tilting movements, and further in that the tool bracket accommodated on the swivel frame is height adjusted by means of an adjusting element provided on the swivel frame, such adjusting element being arranged in driving linkage with an extendable articulated shaft, and further in that the adjusting rod is connected to a first actuating means, the articulated shaft is connected to a second actuating means and each actuating means being firmly mounted not to allow translation thereof on the operator side wall of the machine frame.

2. A woodworking machine as claimed in claim 1, wherein the adjusting rod associated with the swivel frame is designed as a threaded spindle which on one side engages a nut which is swivel-mounted in the swivel frame, and in axial direction accommodated stationary in the same, and is on the other side swivel-mounted about the axle of the associated actuating means and acts together with the associated actuating means via an angle drive.

3. A woodworking machine as claimed in claim 2, wherein the nut is designed as a pin which is provided with a tapped hole extending transverse to its axis, such pin being mounted on a fork shaped bearing of the swivel frame and movable about its axis.

4. A woodworking machine as claimed in claim 1, wherein the adjusting element associated with the tool bracket is designed as a threaded spindle which is provided on the swivel frame in a vertical position, which threaded spindle engages a nut firmly attached to the tool bracket and, via an angle drive, is connected with an articulated shaft provided with joints at both ends thereof.

5. A woodworking machine as claimed in claim 4, wherein the swivel frame is provided with vertical adjusting rods on which the tool bracket with associated guide bushes is arranged for sliding adjustment.

6. A woodworking machine as claimed in claim 1, wherein the articulated shaft is joined to a drive wheel which is connected in driving linkage with an associated actuating element via a circulating element and swivel-mounted on the inner side of the operator-side wall of the machine frame.

7. A woodworking machine as claimed in claim 1, wherein associated with the adjusting rod and the articulated shaft is an actuating element, respectively, and that the actuating elements are preferably arranged at a certain lateral distance and at the same height level.

8. A woodworking machine as claimed in claim 1, wherein the articulated shaft comprises two shaft sections having multi edge areas which engage each other in a telescope-like manner.

9. A woodworking machine as claimed in claim 1, wherein the swivel frame is designed as a casting comprising a vertical wall which is provided with at least one window opening toward the top through which extends a shaft carrying a tool, and which wall, on the side away from the tool comprises a projection which accommodates the vertical threaded spindle associated with the tool bracket and forming the adjusting element, and further possesses guiding means associated with the tool bracket.

10. A woodworking machine as claimed in claim 9, wherein the swivel frame, on its tool side, is provided with a marginal flange extending at least laterally and along the bottom to which a cover plate is attached which limits a chamber associated with the tool.

11. A woodworking machine as claimed in claim 10, wherein the swivel frame is provided with a connector branching off from the chamber and connecting a suction line which can preferably be moved out from the housing-like machine frame via a sleeve.

12. A woodworking machine as claimed in claim 9, wherein the vertical wall of the swivel frame, on the side away from the machine tool, is provided with ribs limited by a circumferential rim flange, such ribs forming two chambers which flank the window and extend over the entire height of the wall, and to each of which chamber an adjusting rod for guiding the tool bracket is associated with said rods being attached with their ends on the rim flange side.

13. A woodworking machine as claimed in claim 1, wherein the bearing brackets receiving the swivel frame are provided with a segment groove which is engaged in a groove and tongue manner by segment-shaped bearing strips attached to the swivel frame.

14. A woodworking machine as claimed in claim 1, wherein the tool bracket is designed as a casting comprising a vertical wall which on one side is provided with projections having guide bushes, as well as a bearing device associated with the shaft carrying the tool and, on the other side, with a projection comprising the nut acting together with the associated threaded spindle.

15. A woodworking machine as claimed in claim 1, wherein the shaft mounted on the tool bracket and carrying the tool is connected in a linkage drive via a stepping down unit with the associated motor which is adjustably mountable on the tool bracket.

16. A woodworking machine as claimed in claim 14, wherein the wall of the tool bracket on the side away from the swivel frame is provided with ribs to which a support plate is adjustably mounted which carries the motor.

17. A woodworking machine as claimed in claim 1, wherein the swivel frame is provided with a fixture for attaching a scoring unit comprising a scoring tool drivable by means of a motor and flush with the tool of the tool bracket.

18. A woodworking machine as claimed in claim 17, wherein the scoring unit is provided with an add-on shield which is screw-mountable on associated mandrels, such add-on shield accommodating the motor, on the one hand, and a support block, on the other hand, which accommodates an adjusting block adjustable in height and comprising the scoring unit, such adjusting block accommodating the axially adjustable shaft of the scoring unit.

19. A woodworking machine as claimed in claim 18, wherein the adjusting block is provided with adjusting screws which are accessible from the top via associated holes in the table board and/or in the swivel frame.

20. A woodworking machine as claimed in claim 1, wherein provision is made for an angle display unit and a height display unit, each of them comprising a pointer and a scale, with one of these elements being attached in the area of an associated window of the operator side wall of the machine frame, and the other element, in the case of the angle display unit, being attached to the swivel frame and in the case of the height display unit being attached to the tool bracket.

* * * * *